United States Patent
Tawil et al.

(10) Patent No.: US 6,690,926 B2
(45) Date of Patent: *Feb. 10, 2004

(54) APPARATUS AND METHOD FOR RECEIVING MULTIPLE DATA STREAMS

(75) Inventors: Carmen Tawil, Austin, TX (US); Saleem Tawil, Austin, TX (US)

(73) Assignee: Northpoint Technology, Ltd., Austin, TX (US)

( * ) Notice: Subject to any disclaimer, the term of this patent is extended or adjusted under 35 U.S.C. 154(b) by 347 days.

This patent is subject to a terminal disclaimer.

(21) Appl. No.: 09/800,354

(22) Filed: Mar. 6, 2001

(65) Prior Publication Data

US 2001/0008835 A1 Jul. 19, 2001

Related U.S. Application Data

(63) Continuation of application No. 09/085,925, filed on May 28, 1998, now Pat. No. 6,208,636.

(51) Int. Cl.⁷ ................................................ H04B 1/06
(52) U.S. Cl. ................... 455/277.1; 455/133; 455/3.02; 455/277.2
(58) Field of Search .......................... 455/277.1, 277.2, 455/272, 3.02, 3.04, 3.06, 278.1, 133, 180.1, 323, 132, 136, 137; 370/351

(56) References Cited

U.S. PATENT DOCUMENTS

| | | | |
|---|---|---|---|
| 3,922,641 A | 11/1975 | Gates, Jr. ................. 340/147 |
| 4,228,402 A | 10/1980 | Plummer ................. 179/1 VL |
| 4,523,155 A | 6/1985 | Walczak et al. | |
| 4,613,990 A | 9/1986 | Halpern | |
| 5,204,981 A | 4/1993 | Karasawa et al. ....... 455/277.1 |
| 5,471,664 A * | 11/1995 | Kim ........................... 455/323 |
| 5,483,663 A * | 1/1996 | Tawil ....................... 455/180.1 |
| 5,511,233 A | 4/1996 | Otten | |
| 5,541,963 A * | 7/1996 | Nakagoshi ............... 455/277.1 |
| 5,584,046 A | 12/1996 | Martinez et al. | |
| 5,761,605 A * | 6/1998 | Tawil et al. ............... 455/12.1 |
| 5,940,452 A * | 8/1999 | Rich ........................... 455/133 |
| 5,960,336 A * | 9/1999 | Ikawa et al. ............. 455/277.2 |
| 6,208,636 B1 * | 3/2001 | Tawil et al. ................ 370/351 |

FOREIGN PATENT DOCUMENTS

| | | |
|---|---|---|
| EP | 0 190 812 | 8/1986 |
| EP | 0 505 038 A | 9/1992 |
| EP | 0 597 225 A1 | 5/1994 |
| JP | 08 079201 A | 3/1996 |

OTHER PUBLICATIONS

Vincenzo Parenti, The First Transmissions in MMDS, Cinescopio (magazine) Oct. 15, 1992, published by Spedizione In ebb. postate Gruppo, Italy.

Dan Collins, Primer on Frequency Coordination Procedures, Manual, Mar. 27, 1989, 20 pages, Issue I, National Spectrum Managers Association.

(List continued on next page.)

Primary Examiner—Nay Maung
Assistant Examiner—John J Lee
(74) Attorney, Agent, or Firm—Russell D. Culbertson; Shaffer & Culbertson, L.L.P.

(57) ABSTRACT

A multiple data stream processing arrangement includes a receiver/signal processor (14) and a plurality of signal input paths (11, 12) which meet at a junction (36). A junction output from the junction (36) provides a single input to the receiver/signal processor (14). A switching arrangement (16) is associated with the plurality of signal input paths (11, 12). The switching arrangement (16) includes a switch (31, 32) connected in each signal input path (11, 12). Each switch (31, 32) responds to an enable signal to allow a data stream applied to the respective input path (11, 12) to pass on to the junction (36) and to the receiver/signal processor (14). Only one signal input path (11, 12) and respective switch (31, 32) is enabled at any given time.

18 Claims, 1 Drawing Sheet

OTHER PUBLICATIONS

Directv, Terrestrial Interference in the DBS Downlink Band, Analysis, Apr. 11, 1994, 29 pages, Directv, Inc., El Segundo, California.

C.W. Lundgren and A.S. May, Radio–Relay Antenna Pointing for Controlled INterference with Geostationary Satellites, The Bell System Technical Journal, Dec. 1969, pp. 3387–3422, vol. 48, No. 10, The Bell System, Madison, Wisconsin.

Richard G. Gould, Report #CC–7201, Geostationary Orbit Avoidance Computer Program, Sep., 1972, pp. 1–77, Federal Communications Commission, Washington, D.C.

International Radio Consultative Committee, XIITH Pienary Assembly, Symposium, 1970, pp. 310–325, vol. IV, Part I, International Telecommunication Union, Geneva.

Bernaudeau, Eric, Diffusion Multicanal Par Micro–Ondes La France, Fait Bands A Part (publisher and date unknown).

Thil, Jerome, "Le Cable . . . Sans Cable!," Technologies Internationales, No. 18, 1995.

Author unknown, "Frequency Range 29.7 MHz to 105 GHz and Associated European Cable of Frequency Allocations and Utilizations," European Radiocommunications Committee Report 25, 1994.

Author unknown, "Sharing the Band 11.7 GHz–12.5 GHz between ENG/OB and Direct–to–Home TV Broadcasting Satellite," European Radiocommunications Committee Report 37, 1995.

Author unknown, "Point–to–Multipoint Systems Used in the Fixed Service," Recommendation International Telecommunication Union–R F.755–1, 1992–1994.

Author unknown, "MMDS Multichannel Microwave Distribution System, " MDS International pamphlet, date unknown.

Bernaudeau, Eric, "Diffusion Multicanal Par Micro–Ondes La France, Fait Bands A Part," publisher and date unknown.

Thil, Jerome, "Le Cable . . . Sans Cable!," Technologies Internationales No. 18, 1995.

Brindley, Keith, "The Smallest Dish on Earth," What Satellite, Aug. 1992.

Vines, James K., "MMDS Goes Over the Horizon," publisher and date unknown.

Author unknown, "Propagation Data Required for the Evaluation of Interference Between Station in Space and Those on the Surface of the Earth," Recommendation International Telecommunication Union–R P.619–1, 1986–1990–1992.

Author unknown, "Propagation Data and Prediction Methods Required for the Design of Terrestrial Line–of–Sight Systems," Recommendation International Telecommunication Union–R P.530–6, 1978–1982–1986–1990–1992–1994–1995.

Author unknown "Frequency Sharing and Coordination Between Systems in the Fixed–Satellite Service and Radio–Relay Systems," International Telecommunication Union, Recommendations of the CCIR, 1990.

European Radiocommunications Committee Decision of 3–7–96 on the Harmonised Frequency Band to be Designated for the Introduction of the Multipoint Video Distribution Systems (MVDS) (ERC/DEC/(96)05), European Radiocommunications Committee, 1996.

Author unknown, "Propagation Data and Prediction Methods Required for the Design of Earth Space Telecommunications Systems," Recommendation International Telecommunication Union–R P.618–6.

Author unknown, "Propagation Data Required for the Design of Earth–Space land Mobile Telecommunications systems," Recommendation International Telecommunication Union–R P.681–4, 1990–1994–1995–1997–1999.

Author unknown, "Characteristics of Precipitation for Propagation Modeling", Recommendation International Telecommunication Union–R P.837–3, 1992–1994–1999–2001.

"Digital Via Satellit", Funkschau, Franzis–Verlag K.G., Munchen, DE, vol. 67, NR. 21, page(s) 58–61, XP000535213 ISSN: 0016–2841.

"TV Distribution in Technology–Neutral Franchisses Using MVDS", by C.G. Wildey, IEE COlloquium on 'MVDS: The Way Forward', Digest No. 1992/078, p. 3/1.6 (authored by an employee of Macroni Electronics Limited).

* cited by examiner

APPARATUS AND METHOD FOR RECEIVING MULTIPLE DATA STREAMS

CROSS REFERENCE TO RELATED APPLICATION

This application is a continuation of U.S. patent application Ser. No. 09/085,925 filed May 28, 1998 now is U.S. Pat. No. 6,208,636.

TECHNICAL FIELD OF THE INVENTION

This invention relates to digital data transmission and more particularly to an apparatus and method for selecting from multiple data streams to produce a single data output.

BACKGROUND OF THE INVENTION

Various types of information may be converted to a digital format and the digital data then transmitted to a user location as a radio frequency signal comprising a digital data stream. A single user location may be able to receive these digital radio frequency transmissions from multiple sources. For example, a user may receive signals directed from one or more terrestrial transmitters. Also, the same user may be able to receive digital radio frequency signals from one or more satellites. Regardless of the source of the radio frequency signals which comprise the digital data stream, each data stream must be processed at the user location to provide useful information.

Direct broadcast satellite (DBS) television transmission is one example of digital radio frequency transmission. In DBS transmission, digital signals on a number of different carrier frequencies are transmitted from a satellite and these multiple carrier frequencies together comprise a data stream. The frequency spectrum now allotted to DBS transmissions comprises the spectrum from 12.2 to 12.7 GHz. Each carrier frequency carries data for several different discrete outputs, which in the DBS example, comprise television channels. In order to use the DBS data stream, the entire data stream is picked up by a suitable antenna and the frequencies are down converted to an intermediate frequency below the radio frequency level. A receiver at the user location demodulates the desired carrier frequency and decodes the demodulated signals to produce a desired output comprising a channel input for a television set.

SUMMARY OF THE INVENTION

It is an object of the invention to provide an apparatus and method for selecting from multiple data streams transmitted on one or more common frequencies and processing the selected data stream.

In order to accomplish this object, an apparatus according to the invention includes a plurality of signal input paths to a single receiver/signal processor. A switching arrangement associated with the signal input paths enables only one of the paths at a given time for communicating a data stream to the receiver/signal processor. Each signal input path may receive a separate data stream including signals at one or more frequencies which may or may not be common to frequencies for signals received on another one of the input paths. By enabling only one input path at a time, the switching arrangement prevents common frequency signals from interfering with each other. Furthermore all of the signals from each source may be processed by the single receiver/signal processor, thus avoiding duplicate signal processing equipment at the user location.

As used in this disclosure, the term "data stream" means digital data transmissions on one or more frequencies from a single source. The frequency or frequencies may be any frequency including radio frequencies and lower frequencies. For example, a data stream may comprise signals transmitted at radio frequencies from a satellite and may also comprise the same signals after down conversion to intermediate frequencies. Also, as used herein "data" shall mean any digital data and shall not be limited to data producing any particular type of output. For example, "data" may comprise the digital signals required to produce a television input for a standard television set. As another example, "data" may comprise digital signals representing Internet communications. As yet another example, "data" may comprise digital voice or telephone information.

The switching arrangement includes a suitable switching device connected in each input path. Each switching device is enabled for passing the data stream only in response to an enable signal supplied to the respective switching device. In the absence of an enable signal the respective switching device serves to block the data stream on the particular input path. The plurality of the input paths meet at a junction having a single output which is connected to the input of the receiver/signal processor. The receiver/signal processor receives signals from the single enabled input path and processes the signals in a manner well known in the art to produce a desired data output.

The apparatus according to the invention has associated with it a separate radio frequency receiving arrangement for each signal input path. Each radio frequency receiving arrangement includes a suitable antenna for receiving signals from a single transmission source. Each radio frequency receiving arrangement further includes a suitable down converter for converting the radio frequency signals to intermediate frequency signals. Each separate data stream of intermediate frequency signals is applied to a different one of the signal input paths to the processing apparatus according to the invention.

In the preferred form of the invention, the processing apparatus includes a controller for controlling the switching arrangement and the various components of the receiver/signal processor. The controller responds to a user entered select input which is associated with certain data within one of the input data streams which may be processed to produce a desired data output. In response to a select input, the controller retrieves from a memory device signal input information for controlling the switching arrangement and signal processing information for controlling the receiver/signal processor. The controller uses the signal input information to enable the signal input path which carries the data stream containing the data for the selected output. The signal processing information causes the receiver/signal processor to tune to the correct carrier frequency carrying the desired data, demodulate transmitted signals, and finally decode the demodulated signals to produce the desired data output.

These and other objects, advantages, and features of the invention will be apparent from the following description of the preferred embodiments, considered along with the accompanying drawing.

DESCRIPTION OF THE PREFERRED EMBODIMENTS

Figure 1:
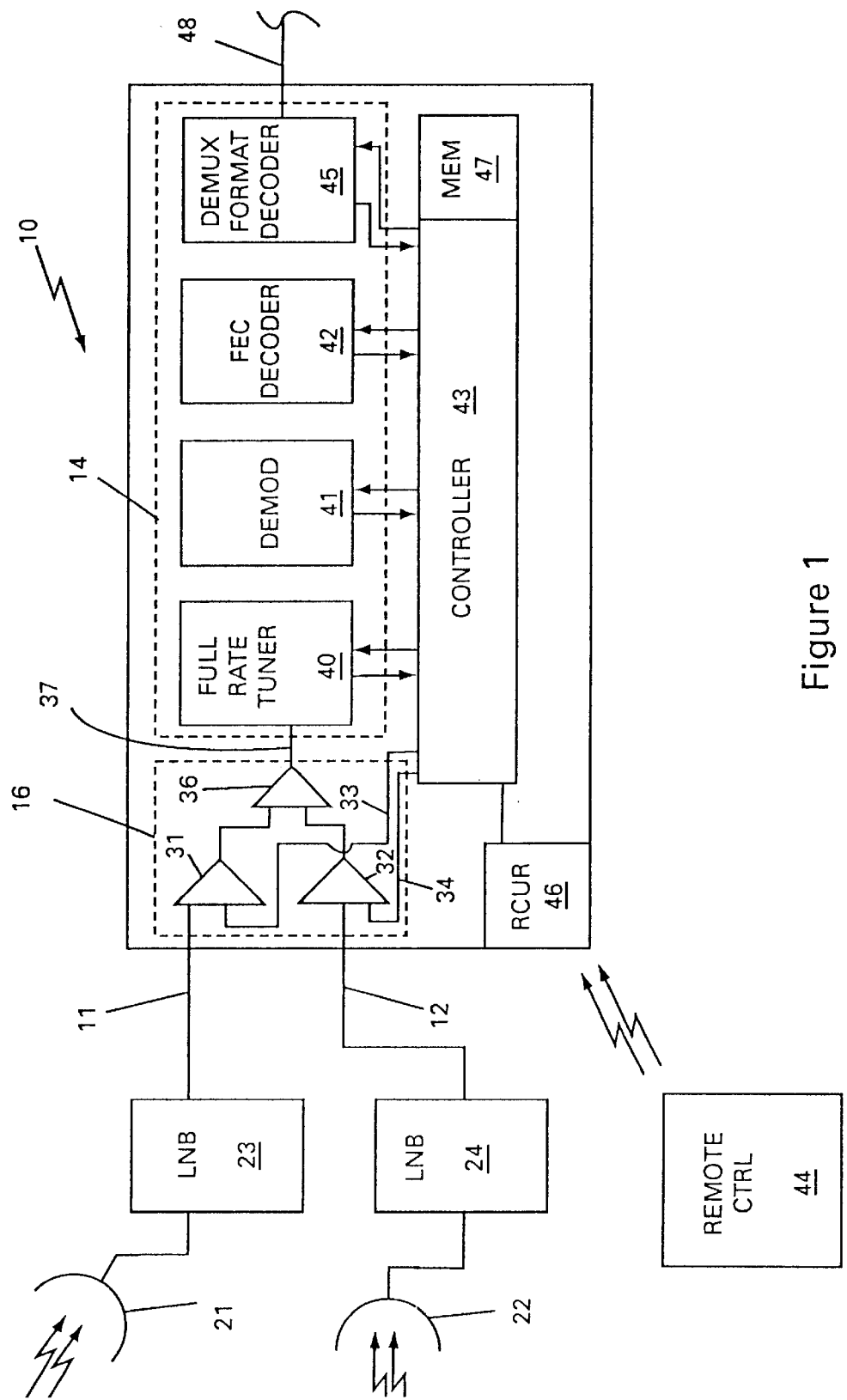
FIG. 1 is a diagrammatic representation of a multiple data stream processing apparatus embodying the principles of the invention.

Referring to FIG. 1, a multiple data stream processing apparatus 10 according to the invention receives one data stream on a first input path 11 and a separate and distinct data stream on a second input path 12. The apparatus 10 includes a receiver/signal processor 14 for receiving one of the two data streams and processing the data stream to produce a desired channel output from the received signals. A switching arrangement 16 allows only one data stream at a time to reach receiver/signal processor 14.

The apparatus 10 is located at a user location which may be any location which may receive data streams from multiple signal sources. The data streams comprise digital data transmitted from a signal source at suitable radio frequencies. Each data stream includes at least one carrier frequency and preferably several carrier frequencies. Each carrier frequency carries data which may be processed to produce at least one channel output. In most cases a single carrier frequency will carry data which may be processed to produce several different channel outputs. The term "channel output" is used in this disclosure for convenience to describe related data which may be used as an input to a television, computer, or other device to produce a desired output from that device. For example, the channel output may be a signal suitable for use by a television. However, the invention is not limited to use with data streams comprising signals for producing a television input. The term "channel data" is used in this disclosure and the accompanying claims to describe certain data in an incoming data stream. Specifically, the "channel data" for a given channel output comprises the data which is used to produce that particular channel output.

In the illustrated example of the invention, signals from one radio frequency transmitter (not shown) are received at a first antenna 21. The signals comprising the transmitted data stream may be in any radio frequency range. For example, the radio frequency transmissions received by the first antenna may be in the range from 12.2 to 12.7 GHz, the frequency band currently allotted for DBS television transmissions. The radio frequency signals received at first antenna 21 are directed to a low noise block converter or LNB 23 where the signals are down converted to an intermediate frequency. The data stream at the intermediate frequency band is directed to the first input path 11 of processing apparatus 10. The intermediate frequency band may, for example, be approximately 950 to 1450 MHz. It is possible that the intermediate frequency could be within another frequency range, however this 950 to 1450 MHz range is useful for purposes of illustration because it corresponds to an intermediate frequency range produced from DBS signals transmitted at between 12.2 and 12.7 GHz.

Signals from a second radio frequency source (not shown) are received at a second antenna 22 and down converted by a second low noise block converter or LNB 24. LNB 24 converts the radio frequency signals to intermediate frequency signals and directs the intermediate frequency data stream to the second input path 12 of processing apparatus 10.

The invention is not limited to signals received from a particular type of signal source. For example, one source may be a satellite while the other radio frequency signal source may be a terrestrial transmitter. Alternatively, both radio frequency signal sources may be satellites or both may be terrestrial transmitters. In any case, the radio frequency signals received by first antenna 21 and second antenna 22 may include signals at the same carrier frequencies. Although in some cases the carrier frequencies received by the two radio frequency receiving antennae 21 and 22 may be identical, in other applications of the invention the two distinct sets of signals may include only a few of the same carrier frequencies or none of the same carrier frequencies and each set may include other carrier frequencies which are not included in the other set. Where the radio frequency transmissions received at the antennae 21 and 22 share at least one common frequency, the signals cannot all be combined on a single propagation path without interference. For example, the first antenna 21 may receive signals at a transmission frequency of 12.2 GHz. The second antenna 22 may receive signals transmitted at the same 12.2 GHz frequency but carrying entirely different data. In this case, if the signals from the two antennae 21 and 22 were combined on a common signal path, the common frequency signals would interfere with each other.

The two signal input paths 11 and 12 pass through switching arrangement 16. Switching arrangement 16 includes a first on/off amplifier or switch 31 connected in the first input path 11, and a second on/off amplifier or switch 32 connected in the second input path 12. First on/off amplifier 31 is connected to receive an enable signal through a first enable line 33 while second on/off amplifier 32 is connected to receive an enable signal applied on a second enable line 34. The output of first on/off amplifier 31 and the output of second on/off amplifier 32 are applied as inputs to a junction amplifier 36. Junction amplifier 36 produces a single junction output at output line 37. Elements 31 and 32 may comprise any suitable on/off amplifier or active switch while the junction amplifier 36 may comprise any suitable summing amplifier.

On/off amplifier 31 operates to pass the intermediate frequency signals or data stream received on input path 11 only when an enable signal is applied to the amplifier through enable input line 33. On/off amplifier 32 similarly operates to pass the intermediate frequency data stream received on input path 12 only when an enable signal is applied to the amplifier through enable input line 34. When an enable signal is not applied to the particular on/off amplifier 31 or 32, the particular amplifier does not pass the respective data stream on to junction amplifier 36. However, when either on/off amplifier 31 or 32 receives an enable signal through its respective enable line 33 or 34, the data stream on the associated input path is passed on to junction amplifier 36 for input to receiver/signal processor 14 through line 37. Junction amplifier 36 ensures that the signals are at the correct impedance for input to the receiver/signal processor 14. As will be discussed in detail below, only one of the on/off amplifiers 31 or 32 is enabled at a given time. Thus, only one of the received data streams is applied as an input to receiver/signal processor 14 at any given time.

Receiver/signal processor 14 receives the single data stream from the junction amplifier 36 and produces a desired channel output similar to a direct broadcast satellite television set-top unit such as an RCA DSS receiver unit or a DVB format receiver unit. The receiver/signal processor 14 includes a full rate tuner and down converter 40, a demodulator 41, a forward error correction (FEC) decoder 42, and a demultiplexer/format decoder 45. Each of these elements is connected to and controlled by a controller 43 which, in the preferred form of the invention, comprises a suitable processor. A user may make a select input to controller 43 to select a desired channel output from signal processor 14. This select input may be entered through the illustrated remote control 44 and remote control signal receiver 46. In response to the select input, the controller 43 sends an enable signal to enable the on/off amplifier 31 or 32 associated with the input path carrying the desired channel data required to produce the desired channel output, thereby selecting the appropriate data stream. The selected data stream is input to receiver/processor 14, and the controller 43 controls the tuner 40 to tune to the particular carrier frequency containing the desired channel data. Tuner 40 then passes this selected carrier frequency to demodulator 41 which demodulates the selected carrier frequency signal to produce signals comprising all data carried on that particular carrier frequency. This data, which may commonly include data for several different channel outputs, is passed to FEC decoder 42 which operates under the control of controller 43 to correct for digital data errors which may have occurred in transmission. The demultiplexer/format decoder 45 then operates under the control of controller 43 to decode the data and separate out the desired channel data from other data to produce the desired channel output. The selected channel output is directed through output line 48 to the equipment (not shown) which may utilize the channel output, such as a television set or computer, for example.

A memory device 47 associated with controller 43 stores information required for controlling the various components of receiver/signal processor 14 and also information for the switching arrangement 16. The stored information includes a channel identifier unique to a particular channel output formed from the channel data included in one of the data streams received on input paths 11 or 12. For each channel identifier, the memory device 47 stores signal path information identifying which on/off amplifier 31 or 32 to enable for passing the desired data to the receiver/signal processor 14. For each channel identifier, memory device 47 also stores signal processing information comprising all control information required by tuner 40, demodulator 41, FEC decoder 42, and demultiplexer/format decoder 45 in order to produce the desired channel output. This signal processing information and the manner in which the tuner 40, demodulator 41, FEC decoder 42, and demultiplexer/format decoder 45 operate are well-known in the art and will not be discussed in detail here.

It will be noted that the apparatus 10 illustrated in FIG. 1 is shown only for convenience in describing the invention. Numerous modifications to the illustrated apparatus 10 may be made within the scope of the invention and the following claims. For example, although two input paths are shown in FIG. 1, any number of input paths may be included in an apparatus embodying the principles of invention. Furthermore, the invention is not limited to any particular radio frequency bands or to any particular intermediate frequency bands.

Another important aspect of the invention is that the signals on the two different input paths 11 and 12 may carry data in entirely different formats such as the DSS, DVB, or MPEG2 formats, for example. As long as the memory device 47 stores the particular signal processing information for allowing demultiplexer/format decoder 45 to decode the data, there is no limit as to the particular data format which may be processed by apparatus 10.

Another variation from the form of the invention shown in FIG. 1 relates to switching arrangement 16. Although the switching arrangement is shown as being integrated with receiver/signal processor 14, the switches can comprise any suitable device for selectively blocking the respective data stream and may be located anywhere in the paths from the respective receiving antennae 21 and 22 to the junction amplifier 36. These variations in switch positions should be considered equivalent to the switching arrangement illustrated in FIG. 1. Of course, if the switching arrangement is not controlled by controller 43, some other arrangement must be included for enabling the desired switch. For example, a simple manual switch may be used to control the particular switching device and enable the desired data stream to the pass on to the receiver/signal processor 14.

A user selects a particular channel output which may include a television channel or some other type of data, by providing a select input to the controller 43 through user input device 44. The controller 43 responds to the select input by accessing the memory device 47 to retrieve the required operational information. The controller 43 locates the channel identifier corresponding to the desired channel output identified by the select input and recalls all of the information required to enable the apparatus 10 to process the incoming data to produce the desired channel output. This information includes signal input information which allows the controller 43 to enable the appropriate on/off amplifier 31 or 32, and enable only the desired data stream to pass on to the receiver/signal processor 14. The information retrieved from the memory device 47 also includes signal processing information for controlling the operation of tuner 40, demodulator 41, FEC decoder 42, and demultiplexer/format decoder 45 to process the selected data stream and produce the desired channel output at output line 48. Since only one signal input path is enabled at any given time, the multiple data streams do not interfere with each other even if they include signals at one or more common frequencies.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. An apparatus for receiving a first stream of data signals at a first input and for receiving a second stream of data signals at a second input, the apparatus comprising:

(a) a first switch connected to the first input and having a first switch output, the first switch for passing the first stream of data signals from the first input to the first switch output in response to a first switch enable signal applied to an enable input associated with the first switch;

(b) a second switch connected to the second input and having a second switch output, the second switch for passing the second stream of data signals from the second input to the second switch output in response to a second switch enable signal applied to an enable input associated with the second switch;

(c) a controller for selectively applying the first switch enable signal and for selectively applying the second switch enable signal; and (d) a memory device connected to the controller, the memory device storing signal path information for a plurality of channel outputs, the signal path information for each respective one of the channel outputs relating the respective channel output to one of the first switch or second switch which must be enabled to pass data signals from which the respective channel output can be produced.

2. The apparatus of claim 1 wherein the memory device also stores signal processing information for each channel output, the signal processing information comprising information required by a signal processor to produce the respective channel output from the respective stream of data signals.

3. The apparatus of claim 2 wherein the signal processor includes:

(a) a full rate tuner and down converter;

(b) a demodulator;

(c) a forward error correction decoder; and (d) a demultiplexer/format decoder.

4. The apparatus of claim 1 further including:
(a) a satellite receiving antenna oriented to receive signals transmitted directly from a satellite transmitter, the first stream of data signals including data received through the satellite receiving antenna; and
(b) a terrestrial receiving antenna oriented to receive signals transmitted directly from a terrestrial transmitter, the second stream of data signals including data received through the terrestrial receiving antenna.

5. The apparatus of claim 1 further including:
(a) a satellite receiving antenna oriented to receive signals transmitted directly from a satellite transmitter, the first stream of data signals being produced from data received through the satellite receiving antenna; and
(b) a terrestrial receiving antenna oriented to receive signals transmitted directly from a terrestrial transmitter, the second stream of data signals being produced from data received through the terrestrial receiving antenna.

6. The apparatus of claim 1 wherein:
(a) the first stream of data signals includes signals on a plurality of first carrier frequencies; and
(b) the second stream of data signals includes signals on at least one of the first carrier frequencies.

7. The apparatus of claim 1 wherein the first stream of data signals and the second stream of data signals each include signals on a common carrier frequency.

8. An apparatus including:
(a) a first switch connected to a first input and having a first switch output, the first switch for passing a first stream of data signals from the first input to the first switch output in response to a first switch enable signal applied to an enable input associated with the first switch;
(b) a second switch connected to a second input and having a second switch output, the second switch for passing a second stream of data signals from the second input to the second switch output in response to a second switch enable signal applied to an enable input associated with the second switch;
(c) a memory device storing signal path information for a plurality of channel outputs, the signal path information for each respective one of the channel outputs relating the respective channel output to one of the first switch or second switch which must be enabled to pass data signals from which the respective channel output can be produced; and
(d) a controller operatively connected to the memory device, the first switch, and the second switch for selectively producing either the first switch enable signal or the second switch enable signal in response to signal path information obtained from the memory device.

9. The apparatus of claim 8 wherein the memory device also stores signal processing information for each channel output, the signal processing information including information enabling a signal processor to produce the respective channel output from the respective stream of data signals.

10. The apparatus of claim 9 wherein the signal processor includes:
(a) a tuner;
(b) a demodulator;
(c) a forward error correction decoder; and
(d) a demultiplexer/format decoder.

11. The apparatus of claim 8 wherein:
(a) the first data stream includes signals on a plurality of first carrier frequencies; and
(b) the second data stream includes signals on at least one of the first carrier frequencies.

12. The apparatus of claim 8 wherein the first data stream and the second data stream include signals on a common carrier frequency.

13. An apparatus including:
(a) a first switch connected to a first input and having a first switch output, the first switch for passing a first stream of data signals from the first input to the first switch output in response to a first switch enable signal applied to an enable input associated with the first switch;
(b) a second switch connected to a second input and having a second switch output, the second switch for passing a second stream of data signals from the second input to the second switch output in response to a second switch enable signal applied to an enable input associated with the second switch;
(c) a satellite receiving antenna oriented to receive signals transmitted directly from a satellite transmitter, the first stream of data signals including data received through the satellite receiving antenna;
(d) a terrestrial receiving antenna oriented to receive signals transmitted directly from a terrestrial transmitter, the second stream of data signals including data received through the terrestrial receiving antenna; and
(e) a controller operatively connected to the first switch and the second switch for selectively producing either the first switch enable signal or the second switch enable signal in response to signal path information for a particular channel output, the signal path information indicating which of the first switch or second switch must be enabled to pass data from which the particular channel output can be produced.

14. The apparatus of claim 13 further including a memory device storing signal path information for the particular channel output along with a plurality of additional channel outputs, the signal path information for each respective one of the channel outputs relating the respective channel output to one of the first switch or second switch which must be enabled to pass data signals from which the respective channel output can be produced.

15. The apparatus of claim 14 wherein the memory device also stores signal processing information for each channel output, the signal processing information comprising information required by a signal processor to produce the respective channel output from the respective stream of data signals.

16. The apparatus of claim 15 wherein the signal processor includes:
(a) a tuner;
(b) a demodulator;
(c) a forward error correction decoder; and
(d) a demultiplexer/format decoder.

17. The apparatus of claim 13 wherein:
(a) the first data stream includes signals on a plurality of first carrier frequencies; and
(b) the second data stream includes signals on at least one of the first carrier frequencies.

18. The apparatus of claim 13 wherein the first data stream and the second data stream each include signals on a common carrier frequency.

* * * * *